(No Model.)
T. GIBNEY.
DEVICE FOR HOLDING PIPE NIPPLES.
No. 515,826. Patented Mar. 6, 1894.
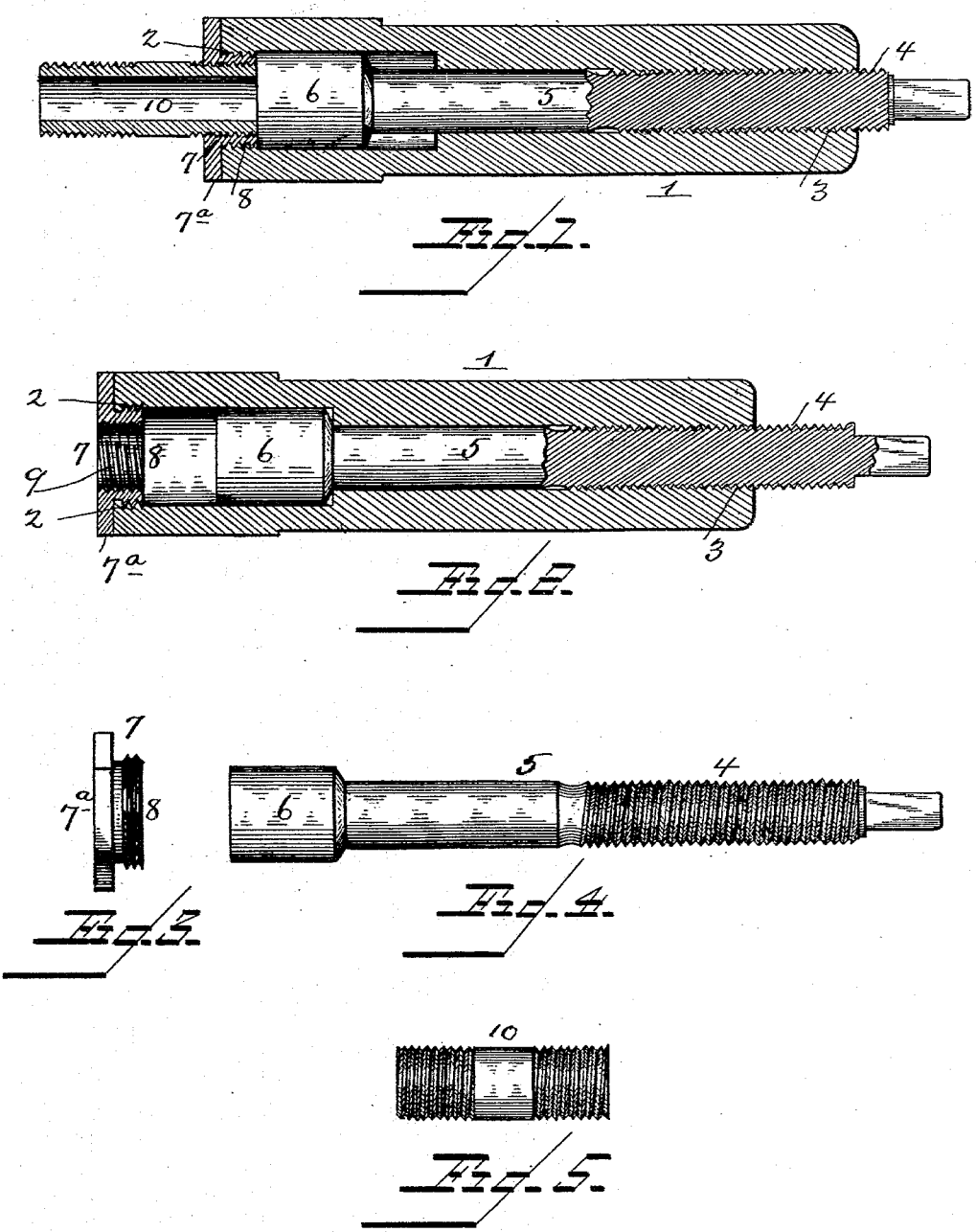
WITNESSES:
INVENTOR:
Terence Gibney,
by Louis Bagger & Co.
Attorneys

UNITED STATES PATENT OFFICE.

TERENCE GIBNEY, OF ROCKAWAY, ASSIGNOR OF ONE-THIRD TO ISRAEL D. CONDIT, JR., OF DOVER, NEW JERSEY.

DEVICE FOR HOLDING PIPE-NIPPLES.

SPECIFICATION forming part of Letters Patent No. 515,826, dated March 6, 1894.

Application filed June 23, 1893. Serial No. 478,616. (No model.)

*To all whom it may concern:*

Be it known that I, TERENCE GIBNEY, a citizen of the United States, and a resident of Rockaway, in the county of Morris and State of New Jersey, have invented certain new and useful Improvements in Devices for Holding Pipe-Nipples; and I do hereby declare that the following is a full, clear, and exact description of the invention, which will enable others skilled in the art to which it appertains to make and use the same, reference being had to the accompanying drawings, which form a part of this specification.

My invention relates to improvements in devices for holding pipe nipples while screw threads are being cut thereon. The ordinary manner of making these nipples, (which consist of short tubes or lengths of gas pipe, screw threaded at each end,) is to take a gas pipe of the proper diameter, and securing the same in a vise, cut threads on the end thereof by a suitable die or cutting instrument. A proper length of the pipe is then cut off to form the nipple and the screw threaded end inserted between the jaws of the vise so as to be held while the threads are being cut on the other end. This manner of making nipples is objectionable in that the screw threads first cut are liable to be injured by being clamped in the vise while the other threads are being cut.

The object of my invention is to obviate the above objections and provide a nipple holding device which can be securely held without the slightest liability of the threads being injured; and it consists in the novel construction and combination of parts hereinafter described and claimed.

In the accompanying drawings: Figure 1 is a central horizontal sectional view of a nipple holder constructed in accordance with my invention. Fig. 2 is a similar view of the socket, the nut and screw rod. Figs. 3 and 4 are elevations of the screw rod and nut, respectively, detached from the socket. Fig. 5 is an elevation of the nipple.

In the said drawings the reference numeral 1 designates a socket consisting of a metallic tube, the bore of which is enlarged at one end and formed with screw threads 2. At the opposite end the socket or tube is provided or formed with interior left-handed screw threads 3, with which engage corresponding male threads 4, on a rod 5. This screw rod at one end is formed with a head 6, and is made angular at the opposite end to receive a wrench for operating the same.

The numeral 7 designates a removable nut having an angular head $7^a$, a screw threaded boss 8, adapted to engage with the screw threads 2, and at its center is formed with a screw threaded aperture 9 to receive the screw threaded end of a nipple 10. In practice a number of these nuts are provided having apertures 9, of varying sizes so as to hold nipples of different diameter.

The manner of using the device is as follows: A screw thread is cut on the end of a gas or other pipe and a length cut off of the proper size to form a nipple. A nut is then screwed into the enlarged end of the socket or tube, the central aperture of which corresponds with the piece of pipe cut. The screw rod is then adjusted to the proper distance from the inner end of the nut so as to form a stop for the piece of pipe 10, which is screwed into the central aperture until its end strikes said head, as seen in Fig. 1. The nipple will now be securely held and threads may now be cut on its outer end without the slightest liability of the threads previously cut being injured. By means of the head 6, the nipple is prevented from being inserted too far in the nut and thus binding in the same and it also enables the last threads formed to be cut clear up to the threads of the opposite end, if desired, as the said head can be so adjusted or regulated that only a portion of the threads first cut enter the nut, as seen in Fig. 1. By making the threads of the rod left-handed it will not be rotated while the threads are being cut, which might happen if they were right-handed or the same as those on the nipple.

Having thus described my invention, what I claim is—

In a device for holding nipples the combination with the socket having one end enlarged and formed with interior screw threads and the other end provided with oppositely formed threads and the screw rod having an enlarged head located and movable in said socket, of the removable nut having an angular head, a screw threaded boss adapted to engage with said enlarged threaded end, and formed with a central screw threaded aperture; substantially as described.

In testimony that I claim the foregoing as my own I have hereunto affixed my signature in presence of two witnesses.

TERENCE GIBNEY.

Witnesses:
 ELIOT B. MOTT,
 JAMES H. SANDERS.